(12) United States Patent
Chen

(10) Patent No.: US 6,356,995 B2
(45) Date of Patent: *Mar. 12, 2002

(54) MICROCODE SCALABLE PROCESSOR

(75) Inventor: Hong-Yi Hubert Chen, Fremont, CA (US)

(73) Assignee: picoTurbo, Inc., Milpitas, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/109,762

(22) Filed: Jul. 2, 1998

(51) Int. Cl.$^7$ .............................. G06F 9/455; G06F 9/22
(52) U.S. Cl. ........................... 712/209; 712/35; 712/37; 712/211; 703/26; 345/522
(58) Field of Search ................................. 712/1, 35, 37, 712/209, 211; 703/26; 345/522

(56) References Cited

U.S. PATENT DOCUMENTS

| | | | |
|---|---|---|---|
| 4,511,966 A | | 4/1985 | Hamada |
| 4,514,803 A | | 4/1985 | Agnew et al. |
| 4,849,922 A | * | 7/1989 | Riolfo ......................... 708/402 |
| 4,870,614 A | | 9/1989 | Quatse |
| 5,600,845 A | * | 2/1997 | Gilson ......................... 712/232 |
| 5,606,714 A | * | 2/1997 | Intrater et al. ................. 712/35 |
| 5,619,665 A | * | 4/1997 | Emma ......................... 712/208 |
| 5,630,153 A | * | 5/1997 | Intrater et al. ............. 710/110 |
| 5,784,636 A | * | 7/1998 | Rupp ........................... 712/37 |
| 5,968,161 A | * | 10/1999 | Southgate .................... 712/37 |
| 5,970,254 A | * | 10/1999 | Cooke et al. ................. 712/37 |
| 6,105,129 A | * | 8/2000 | Meier et al. ................. 712/222 |

FOREIGN PATENT DOCUMENTS

| | | |
|---|---|---|
| WO | WO9724660 | 7/1997 |

* cited by examiner

Primary Examiner—William M. Treat
(74) Attorney, Agent, or Firm—Sawyer Law Group LLP

(57) ABSTRACT

A processing system in accordance with the present invention is disclosed. The processing system comprises a processor and a microcode sequencer coupled to the processor. The microcode sequencer includes a plurality of modules. Each of the modules enables a specific function based upon a selection signal from the processor. A system and method in accordance with the present invention provides for many advantages over conventional systems. First of all, there is an efficient register bank and the hardware is smaller and more efficient than a DSP. Finally, since it is possible to program macro instructions for different applications, it is more flexible than DSP systems. It also is smaller, has a lower gate count and is faster to market because it is software programmable. Unlike RISC or coprocessor type systems, only a single assembler is needed to handle DSP and multimedia instructions. In addition, a large cache memory is not required while having a higher code density for a particular application.

Finally, it requires a smaller register file through the general purpose processor than a media processor, and thus context switching is faster. It does not have a big data path as a media processor. It also has higher code density and it is easier to program than a media processor application. Accordingly, a system and method in accordance with the present invention provides significant utility over existing conventional systems.

20 Claims, 4 Drawing Sheets

MICROCODE SCALABLE PROCESSOR

FIELD OF THE INVENTION

The present invention relates generally to a processing system and more particularly to a processing system that is scalable via microcode.

BACKGROUND OF THE INVENTION

Processor architectures are utilized for a variety of functions. For example, they are utilized for media applications, for a fast fourier transfer (FFT), for a discrete cosine transform (DCT) or a finite input response (FIR) application. Conventional processor architectures are utilized to implement these functions. Each of these known architectures have problems when attempting to implement a particular function.

One conventional processor architecture comprises a digital signal processor (DSP). A DSP is typically utilized to provide a specific function such as a FFT. However, the functionality of a DSP is hardware specific, that is, the register bank associated therewith is specific to a particular application and the instructions associated therewith are specific to the function. Therefore this system is not flexible enough to accommodate various functions.

A second approach is to implement an Application Specific Signal Processor (ASSP). This ASSP has a high gate count and is not software programmable. Accordingly, the ASSP also does not provide a low cost effective solution if the processor architecture is to implement a plurality of functions.

A third approach is to provide a MMX type processor such as a Pentium processor manufactured by Intel Corporation, or a K6 processor manufactured by Advanced Micro Devices to implement a plurality of functions. However, these chips are large and complex and have high memory requirements. They typically include a large cache memory that increases the overall size of the processor. In addition there is no guarantee that the bandwidth for the MMX execution because an interrupt can occur in between the operation of the MMX instruction set.

A fourth approach is to utilize a RISC processor in conjunction with a coprocessor. However, in this approach, there are two different fetch streams and both processors fight for control of the bus. In addition, this system requires has a high memory requirement and low code density which also affects chip size.

A final approach is to utilize a general purpose media processor. However, this type of processor requires a large register file and therefore context switching is slow. In addition this approach has a large datapath, low code density and is therefore difficult to program. In addition this approach is not suitable for real time applications.

Accordingly, what is needed is a system and method that will allow a plurality of processors to provide a variety of functions while not requiring a significant amount of processing power. The system must be easy to implement utilizing existing technologies. The present invention addresses such a need.

SUMMARY OF THE INVENTION

A processing system in accordance with the present invention is disclosed. The processing system comprises a processor and a microcode sequencer coupled to the processor. The microcode sequencer includes a plurality of modules and an associated pipeline if needed. Each of the modules enables a specific function based upon a selection signal from the processor. A system and method in accordance with the present invention provides for many advantages over conventional systems. First of all, there is an efficient register bank and the hardware is smaller and more efficient than a DSP. Finally, since it is possible to program macro instructions for different applications, it is more flexible than DSP systems. It also is smaller, has a lower gate count and is faster to market because it is software programmable and synthesizable. Unlike RISC or MMX type systems, only a single assembler is needed to handle DSP and multimedia instructions. In addition, a large cache memory or dual port memory is not required while having a higher code density for a particular application.

Finally, it requires a smaller register file than a media processor, and thus context switching is faster through the general purpose processors. It does not have a big data path as a media processor. It also has higher code density and it is easier to program than a media processor application. Accordingly, a system and method in accordance with the present invention provides significant utility over existing conventional systems.

DETAILED DESCRIPTION OF THE INVENTION

The present invention relates to an improvement in a processing system. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
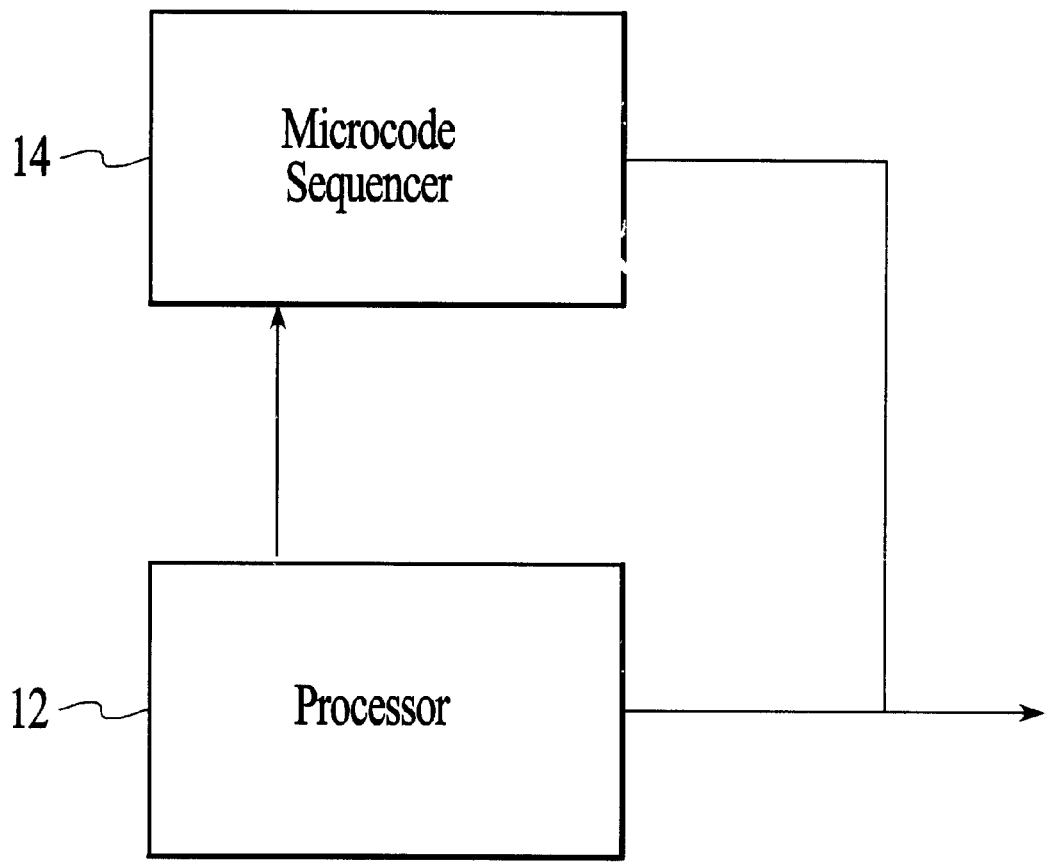
FIG. 1 is a simple block diagram of a processing system in accordance with the present invention.

FIG. 1 is a simple block diagram of a processing system 10 in accordance with the present invention. The pipeline stages of the processing system 10 comprise a fetch (F) stage, a decode (D) stage, an execute (E) stage, a memory (M) stage and a writeback(W) stage. The processing system 10 includes a general purpose processor 12 and a microcode sequencer 14 coupled to the general purpose processor 12. As will be discussed in detail hereinafter the microcode sequencer 14 includes a plurality of modules when enable a plurality of media functions such as a FFT, DCT, FIR or the like. A specific media function is enabled based upon a selection signal from the general purpose processor 12.

Figure 2:
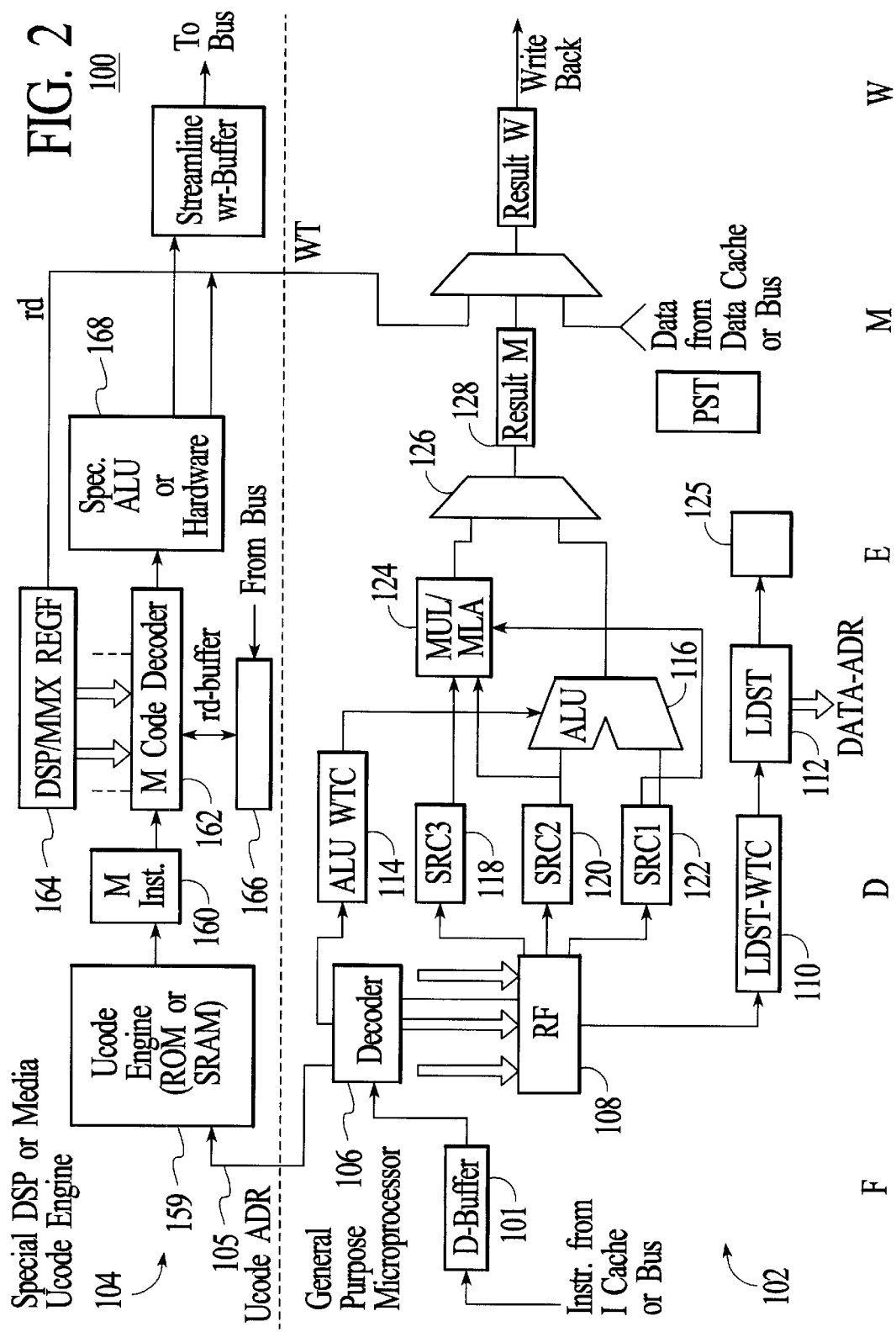
FIG. 2 is a detailed block diagram of a system in accordance with the present invention.

To more specifically describe the features of the present invention, refer now to FIG. 2. FIG. 2 is a detailed block diagram of a processing system 100 in accordance with the present invention. The processing system 100 includes a general purpose processor 102 and a microcode sequencer 104b. What is meant by a microcode sequencer is traditional microcode or a regular RISC like instruction stream. For example, the microcode sequencer could be implemented utilizing a SRAM base media and a DSP engine. The DSP engine could then provide DSP/decoder like instructions. In this embodiment, a bit would be enabled within the decode to enable clocking of the DSP/media engine. This system is a microcode scalable processing system, which includes the fetch stage, decode stage, execute stage, execution stage, memory stage and writeback stage as described with FIG. 1.

General Purpose Processor 102

The general purpose processor 102 operates in a conventional manner. For example, when instructions are provided to the decoder 106 via decode buffer 101, the decoder 106 provides information to the register file (RF) 108. The RF 108 provides control information to a load store register 110. The load store register 110 retains information for the operation of the load store unit 112. The decoder 106 provides control information to an arithmetic logic unit register 114. An ALU register 114 holds information to control the ALU 116. The RF 108 provides operand information to three registers 118, 120 and 122.

As is seen, the results of register 118, 120 and 122 are provided to a multiply/multiply add unit 124. The results of register 120 and register 122 are provided to the ALU 116. In the load store operation all the addresses to the E stage are provided as is shown to the data register 125, and the data will come back in the M stage. Accordingly, if the data is a multiply instruction, the multiply unit 124 will generate the result 128 during the M stage. If the data is an ALU instruction, then the ALU 116 will generate the result during the execution stage.

In addition, as has been above described, there is another path in the processing system 100. This is the path for the decoder 106 of the general purpose processor 102 to the microcode sequencer 104. This path is utilized for high performance or very specific requirements such as an FFT, DCT, FIR, or media DSP engine functions.

Microcode Sequencer 104

Accordingly, the microcode sequencer 104 allows for a very specific subroutine to be implemented to provide the particular function based upon the selection by the decoder 106. For example, the function could be an FFT subroutine, a DCT subroutine, or some other type of subroutine to implement the particular function. The microcode sequencer 104 includes a microcode engine 159, which is typically RAM/ROM which receives the entry address from the decoder 106.

The microcode sequencer also includes a microcode instruction register 160 which receives microcode instructions from the microcode engine 159. The microcode instruction register 160 in turn provides those instructions to a microcode decoder 162. The microcode decoder 162 receives operands from either a register file 164 from within the microcode sequencer 104 or from a buffer or FIFO 166 which receives information from the system bus (not shown). The decoder 102 provides control signals to the hardware 168 of the microcode sequencer 104. The hardware 168 in turn provides signals during the execute stage either to a streamlined write buffer 170 which provides this information on a bus (not shown) or provides the information directly to the general purpose processor 102 through the W stage.

In a preferred embodiment, a bit in the decoder 106 is set to indicate whether the instruction from the data buffer 101 is for the general purpose processor 102 or for the microcode sequencer 104. Accordingly, the decoder 106 dispatches an entry instruction or entry address to the microcode engine 130 within the microcode sequencer 104 and thereafter the microcode engine 130 will operate to execute the particular function.

Figure 3:
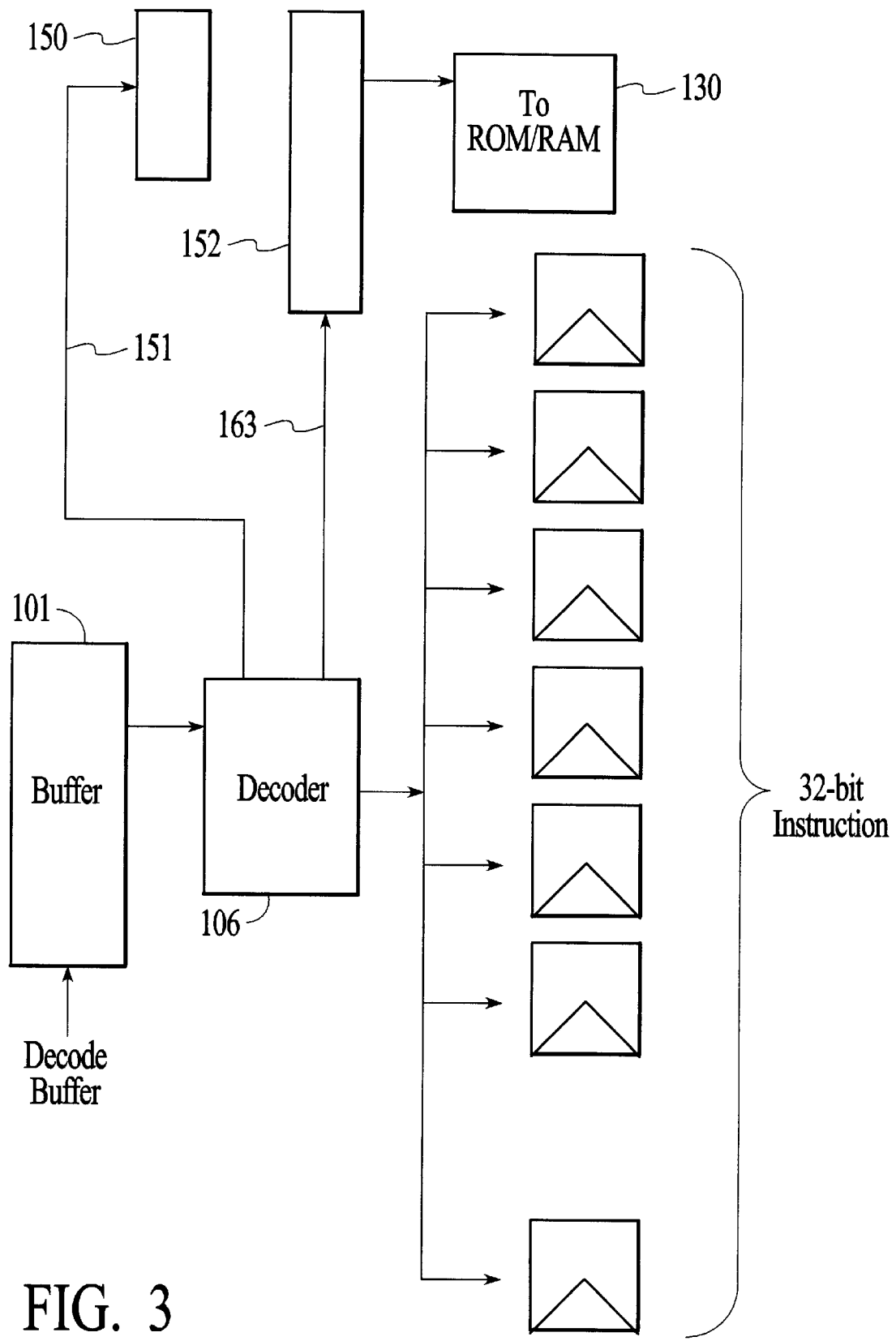
FIG. 3 is a block diagram of the decoder block of FIG. 2.

To describe this feature in more detail, refer now to FIG. 3. FIG. 3 shows the decoder 106 fetching in a preferred embodiment a 32 bit instruction. If the instruction is a normal instruction, it will be provided to the general purpose processor 102. However, if it is an instruction for the microcode sequencer 104, a macro instruction entry 150 is mapped to the microcode ROM entry address 150 and a select signal 163 is provided from the decoder 106 to a multiplexer 152 to select the entry address 150. In this embodiment, the entry address 150 is then provided to the microcode engine 130.

Thereafter, the microcode engine 130 controls the hardware 168 of the microcode sequencer 104 to provide the particular function. Accordingly, the microcode engine 130 receives consecutive entries related to a particular subroutine.

Figure 4:
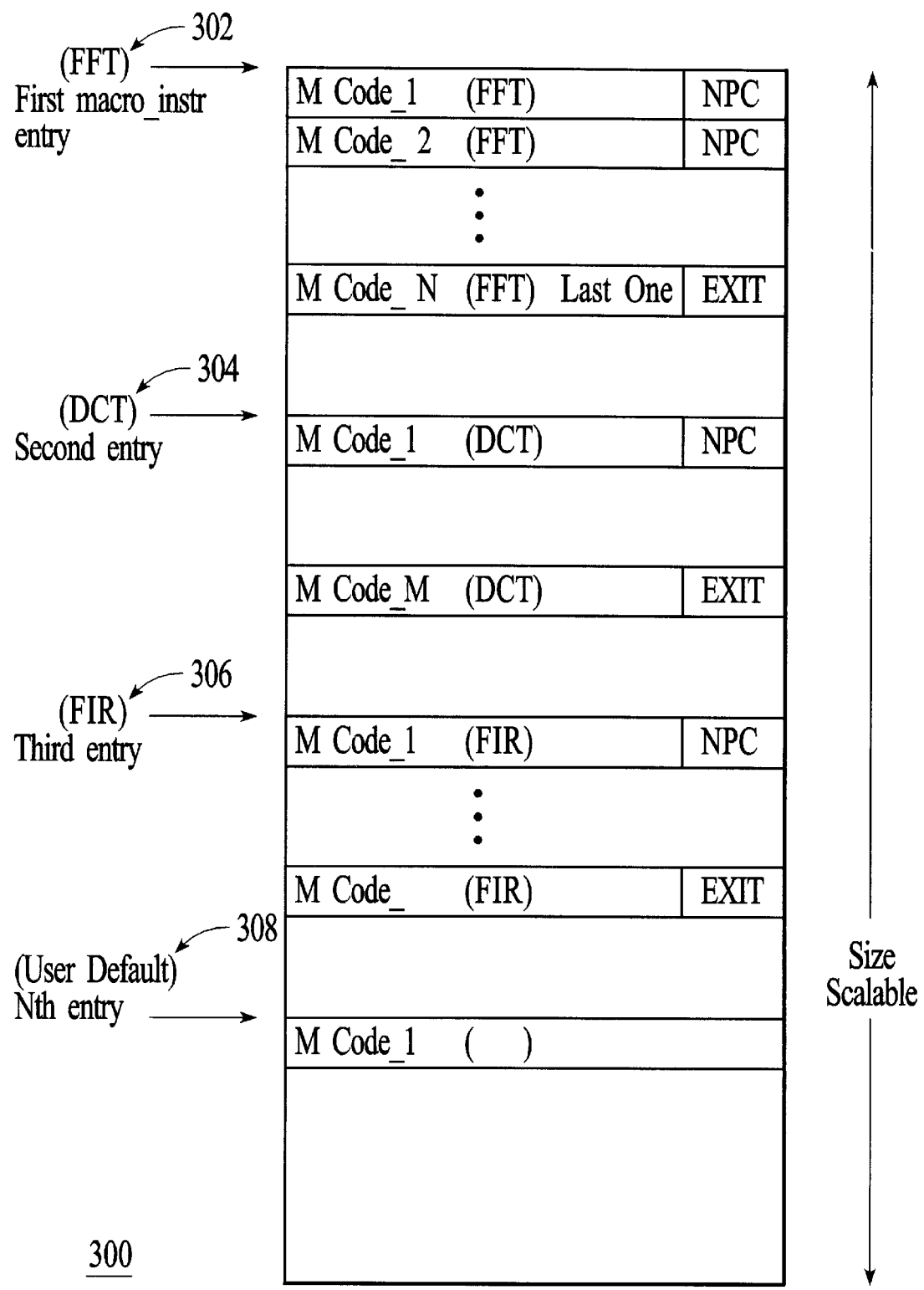
FIG. 4 illustrates a microcode ROM/RAM structure in accordance with the present invention.

Referring now to FIG. 4 illustrates this feature in detail. As is seen in FIG. 4, the microcode 300 includes a plurality of functions, for example, an FFT function 302, a DCT function 304, an FIR function 306 and a default function 308. Each of the functions are initiated by a particular macro instruction entry address, and thereafter the code associated with that entry address will continue until that function is completed. As is seen, the microcode 300 is scalable to any size depending upon the particular function that is to be implemented. Accordingly, the particular program counters for each function can be accessed until that particular instruction is completed. In so doing, the particular function can be executed.

The microcode can therefore be tailored to a specific subroutine rather than having to have the overhead associated with the conventional processors such as the MMX processor. Since it is also configurable, based on the microcode, the system does not have to be limited to a specific function. The hardware 168 provides data to either a buffer which can provide data back to the register file of the general purpose processor, or provides it directly to the general purpose processor, depending on timing issues.

A system and method in accordance with the present invention provides for many advantages over conventional systems. First of all, there is an efficient register bank and the hardware is smaller and more efficient than a DSP. Finally, since it is possible to program macro instructions for different applications, it is more flexible than DSP systems. It also is smaller, has a lower gate count and is faster to market because it is software programmable. Unlike RISC and coprocessor type systems, only a single assembler is needed to handle DSP and multimedia instructions. In addition, a large cache memory or dual port memory is not required while having a higher code density for a particular application.

Finally, it requires a smaller register file than a media processor, and thus context switching is faster through the general purpose processor. It does not have a big data path as a media processor. It also has higher code density and it is easier to program than a media processor application. Accordingly, a system and method in accordance with the present invention provides significant utility over existing conventional systems.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A processing system for processing multimedia instructions comprising:
   a processor; and
   a microcode sequencer coupled to the processor; the microcode sequencer including a plurality of modules, each of the modules enabling a specific function based upon a selection signal from the processor wherein one of the plurality of modules comprises a discrete cosine transform (DCT) subroutine.

2. The system of claim 1 in which the microcode sequencer comprises a SRAM base and a DSP engine to handle DSP/media by microcode-like instruction stream.

3. The system of claim 1 wherein the processor includes a decoder, the decoder providing the selection based upon the type of instruction provided to the processor.

4. The system of claim 2 wherein the processor includes a decoder, the decoder providing the selection based system on entry point of the microcode entrance or subroutine entrance.

5. The system of claim 3 in which a bit within the decoder is set to enable the selection signal and enable locking of the DSP/media engine.

6. The system of claim 1 in which the processor includes:
   a decode buffer for receiving instructions; and
   a decoder coupled to the decode buffer and the microcode sequencer for determining the type of instruction received by the decode buffer; the decoder for enabling the selection signal to select the specific function of the microcode sequencer based upon the type of instruction.

7. The system of claim 6 in which the decoder includes:
   a multiplexer which is enabled by the selection signal and also receives a macro instruction that maps an entry address to a microcode engine within the microsequencer.

8. The system of claim 7 wherein the microcode engine comprises a RAM/ROM.

9. The system of claim 1 wherein the plurality of modules comprises a plurality of programmable subroutines.

10. The system of claim 9 in which the plurality of programmable subroutines comprise a fast fourier transform (FFT) subroutine and a finite input response (FIR) subroutine.

11. The system of claim 10 in which the microcode sequencer includes:
    a microcode engine for receiving the selection signal and providing the specific function;
    a microcode decoder means for decoding the instructions;
    a hardware mechanism for receiving the decoded instructions and for providing one of the specific functions.

12. A processing system for processing multimedia instructions comprising:
    a microcode sequencer; the microcode sequencer including a plurality of modules, each of the modules enabling a specific function wherein one of the plurality of modules comprises a discrete cosine transform (DCT) subroutine; and
    a processor coupled to the microcode sequencer, the processor including a decode buffer for receiving instructions; and a decoder coupled to the decode buffer and the microcode sequencer for determining the type of instruction received by the decode buffer; the decoder for enabling a selection signal to select the specific function of the microcode sequencer based upon the type of instruction.

13. The system of claim 12 wherein the processor includes a decoder, the decoder providing the selection based upon the type of instruction provided to the processor.

14. The system of claim 12 in which a bit within the decoder is set to enable the selection signal.

15. The system of claim 12 in which the decoder includes:
    a multiplexer which is enabled by the selection signal and also receives a macro instruction that maps an entry address to a microcode engine within the microsequencer.

16. The system of claim 15 wherein the microcode engine comprises a RAM/ROM.

17. The system of claim 12 wherein the plurality of modules comprises a plurality of programmable subroutines.

18. The system of claim 17 in which the plurality of programmable subroutines comprise a fast fourier transform (FFT) subroutine and a finite input response (FIR) subroutine.

19. The system of claim 18 in which the microcode sequencer includes:
    a microcode engine for receiving the selection signal and providing the specific function;
    a microcode decoder means for decoding the instructions; and
    a hardware mechanism for receiving the decoded instructions and for providing one of the specific functions.

20. A processing system for processing multimedia instructions comprising:
    a microcode sequencer; the microcode sequencer including a plurality of modules, each of the modules enabling a specific function wherein one of the plurality of modules comprises a discrete cosine transform (DCT) subroutine, the microcode sequencer including a microcode engine for receiving the selection signal and providing the specific function; a microcode decoder means for decoding the instructions; and a hardware mechanism for receiving the decoded instructions and for providing one of the specific functions; and
    a processor coupled to the microcode sequencer, the processor including a decode buffer for receiving instructions; and a decoder coupled to the decode buffer and the microcode sequencer for determining the type of instruction received by the decode buffer; the decoder for enabling a selection signal to select the specific function of the microcode sequencer based upon the type of instruction, the decoder including a multiplexer which is enabled by the selection signal and also receives a macro instruction that maps an entry address to a microcode engine within the microsequencer, wherein a bit within the decoder is set to enable the selection signal.

* * * * *